US008413373B2

(12) United States Patent
    Vered

(10) Patent No.: US 8,413,373 B2
(45) Date of Patent: Apr. 9, 2013

(54) METHOD OF CUTTING CROPS

(75) Inventor: Eli Vered, Kibbutz Magal (IL)

(73) Assignee: Netafim, Ltd., Tel Aviv (IL)

( * ) Notice: Subject to any disclaimer, the term of this patent is extended or adjusted under 35 U.S.C. 154(b) by 274 days.

(21) Appl. No.: 12/958,886

(22) Filed: Dec. 2, 2010

(65) Prior Publication Data

US 2011/0072718 A1    Mar. 31, 2011

Related U.S. Application Data

(63) Continuation-in-part of application No. PCT/IL2009/000554, filed on Jun. 3, 2009.

(60) Provisional application No. 61/129,094, filed on Jun. 4, 2008.

(51) Int. Cl.
*A01B 79/00*    (2006.01)
*A01B 79/02*    (2006.01)
*A01C 1/00*    (2006.01)
*A01G 1/00*    (2006.01)
*A01H 3/00*    (2006.01)

(52) U.S. Cl.
USPC ........................................................ 47/58.1 R

(58) Field of Classification Search ............... 47/58.1 R, 47/1.01 R; 111/100, 900
See application file for complete search history.

(56) References Cited

U.S. PATENT DOCUMENTS

| | | | |
|---|---|---|---|
| 2001/0003240 A1* | 6/2001 | Ferraris | 56/220 |
| 2003/0126849 A1* | 7/2003 | Scott | 56/235 |
| 2005/0011175 A1* | 1/2005 | Nixon | 56/28 |

OTHER PUBLICATIONS

International Search Report in PCT/IL2009/000554, dated Jan. 21, 2010.

* cited by examiner

*Primary Examiner* — Monica Williams
(74) *Attorney, Agent, or Firm* — Womble Carlyle

(57) ABSTRACT

A method of cutting crops is suitable for the production of biofuel. The crops are of the kind that first grows a stem bearing seeds and subsequently grows branches bearing seeds. The crops are irrigated and grown until a majority of them have grown seeds and then are cut by a motor vehicle before a majority of them have grown branches bearing seeds.

20 Claims, 2 Drawing Sheets

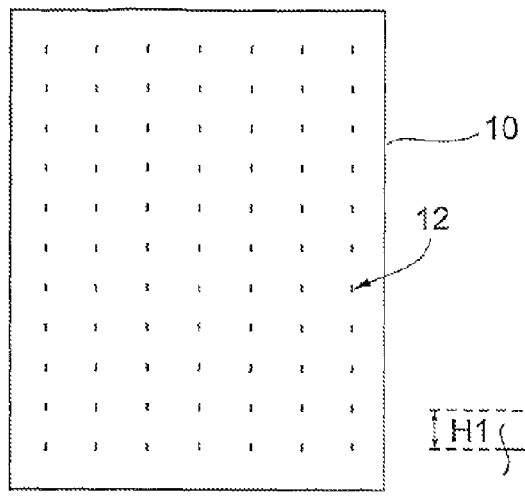
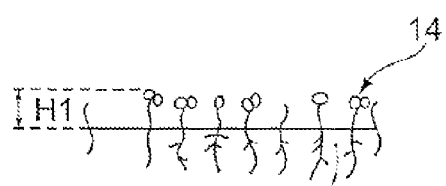
Fig.1A  Fig.1B
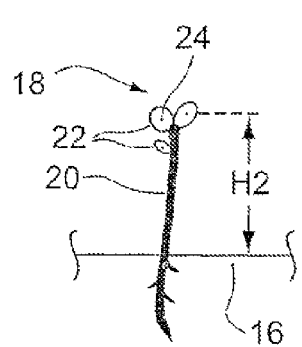
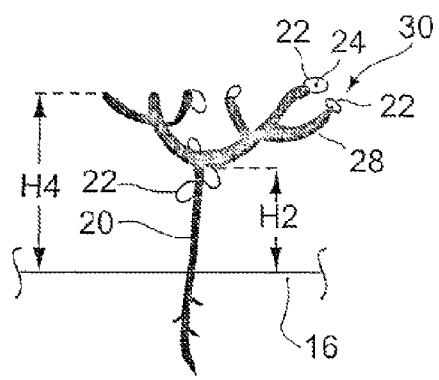
Fig.1C  Fig.1E
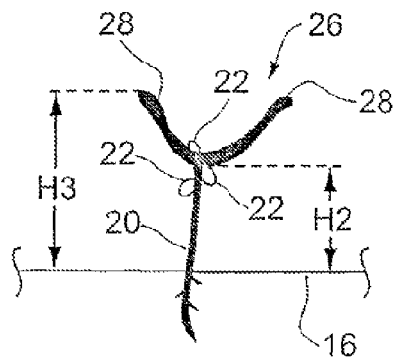
Fig.1D

METHOD OF CUTTING CROPS

RELATED APPLICATIONS

This is a Continuation-in-Part of International Application No. PCT/IL2009/000554, filed 3 Jun. 2009 and published as WO 2009/147672 on 10 Dec. 2009, which claims priority to U.S. Provisional application No. 61/129,094, filed 4 Jun. 2008. The contents of the aforementioned International and U.S. Provisional patent applications are incorporated by reference in their entirety.

FIELD OF THE INVENTION

This invention relates to a method of cutting crops, and more particularly to a method of cutting crops using a motor vehicle.

BACKGROUND OF THE INVENTION

A biofuel such as biodiesel is a term referring to non-petroleum-based diesel fuel. Biodiesel may be obtained from various feedstocks such as seeds grown from crops, animal fats and algae.

Crops which grow seeds that are used in the production of biodiesel include Jatropha, Mahua, Pongamia and Simarouba.

While different crops may have dissimilar developmental growth stages, seeds for use in the production of a biofuel such as biodiesel are generally grown and gathered in the following manner:
- crops are planted in a predetermined area;
- the crops are irrigated;
- the crops grow to a certain height;
- a central stem (hereinafter "stem") of each of the crops begins to produce flowers bearing seeds;
- branches grow from nodes of the stem;
- the stem and/or branches may in some cases be trellised to enable the crops to grow further;
- the branches begin to produce flowers bearing seeds; and
- the flowers and hence the seeds are manually cut from the crops when the flower is determined to have reached an appropriate growth stage.

SUMMARY OF THE INVENTION

In accordance with a first aspect of the present invention, there is provided a method of harvesting seeds suitable for the production of biofuel from crops of the kind that first grows a stem bearing seeds and subsequently grows branches bearing seeds, said method including the following steps:
a) planting in a predetermined area, crops suitable for the production of a biofuel such as biodiesel;
b) irrigating the crops until a majority thereof have grown seeds;
c) providing a motor vehicle adapted for cutting the crops; and
d) operating the motor vehicle to cut the crops before a majority thereof have grown branches bearing seeds.

It should be noted that an optimal time for cutting the crops may be essentially earlier than before the crops grow branches bearing seeds. The optimal cutting time may differ per region and per crop species. Thus, one option for determining the optimal cutting time may be a predetermined time period after a majority of the crops have grown flowers bearing seeds on the stem thereof. Alternatively, the optimal cutting time may be when a majority of the crops, in particular, their stems, have reached a predetermined height. The predetermined height may be between 1-2 meters. The operating of the motor vehicle to cut the crops may include cutting all of the crops in the predetermined area.

Any type of crops which produce seeds suitable for being used for the production of a biofuel such as biodiesel, and can be cut in accordance with the method described above, should be considered suitable for the method of the present invention. The crops may be perennial. The crops may be hybrid plants produced by impregnating the pistol of one species with the pollen of another. The crops may be planted as seedlings or seeds. Some examples of suitable crops are Jatropha, Mahua, Pongamia and Simarouba.

The above method of cutting crops may constitute a part of a method of providing seeds for the production of a biofuel such as biodiesel, the latter method further including gathering the seeds from the crops which have been cut. Such gathering may be performed by the same motor vehicle, as it cuts the crops. The gathering of the seeds may include gathering of all of the seeds in the predetermined area (i.e. 'all' of the seeds referring to crops which have been planted within a small time period, such that the crops are considered all to be within a common developmental stage. In a case where crops are planted at different times in different zones of a single field, i.e. where each zone defines a predetermined area but is not physically separated from the other zones, the gathering time of each of the crops in each zone may be determined by making a statistical analysis of a sample taken in a given zone and determining if that sample is ready for cutting. Such gathering of all of the seeds in the predetermined area may be achieved in a single operation of the motor vehicle.

The planting of the crops may be carried out in rows spaced a predetermined distance apart, to facilitate movement of the motor vehicle through said predetermined area. Irrigation of the crops may include an underground irrigation system. The underground irrigation system may comprise a drip irrigation arrangement including a predetermined number of drippers per plant.

After the seeds have been gathered, the predetermined area may be rendered free of crops to allow replanting of new crops therein. The rendering may be carried out by plowing the predetermined area for planting of new crops. Once replanting is made possible by rendering the predetermined area free of crops, there may be performed a repetition of steps (a) to (d) above in the predetermined area. Alternatively, after the seeds have been gathered stems left over in the ground in the predetermined area may be irrigated to revive them for another round of flowering. Such irrigation is a type of "wake up call" that may revive the crops for another round of flowering. It should be noted that prior to cutting, irrigation is typically not provided to the crop so that the seedlings of the crop form a shell that makes them suitable for cutting. In such case there may be performed a repetition of steps (c) and (d) above in said predetermined area. In either case, after the repetition of step (d), gathering of the seeds may again be carried out. The repetition may occur at least once a year. It should therefore be understood that crops may be planted, cut and gathered at least twice in the predetermined area within a year.

In accordance with another aspect of the invention, there is provided the method of harvesting such seeds by: cutting the crops with a motor vehicle after a majority of the crops have grown stems bearing seeds, but before a majority of the crops have grown branches bearing seeds.

In accordance with yet another aspect of the invention, this is provided the method of harvesting such seeds by raising and cutting a first crop and then raising and cutting a second crop, all within 12 months.

Thus, in addition to known advantages of using a motor vehicle for performing operations that used to be manual, the 'early cutting' operation as defined in step (d) above allows for additional advantages including the following:

the total amount of seeds that may be gathered from the predetermined area after at least one repetition may be greater than that gathered from the same area over the same total time period using the traditional cutting and gathering method;

non-uniform flower growth, which necessitates manual cutting of the flowers and requires a large amount of manpower over an extended period of time, is no longer a significant factor;

a large quantity of seeds to be gathered and the gathering date therefor may be accurately estimated in advance, and therefore resources such as future manpower required, storage facilities needed, and delivery to customers may all be preplanned and arranged more accurately than was previously possible;

the seeds are able to be gathered when still in their natural wrapping (i.e. when contained within a flower), and hence are protected from damage;

gathering of the seeds while still connected to the cut crops is simpler and requires less manpower than when the flowers become detached from the crops; and no manpower is required for trellising.

In accordance with further aspects of the invention, there are provided seeds producible by the method described above and a biofuel such as biodiesel fuel produced from such seeds. Further to the advantages listed above, it is clear that the claimed method may reduce uncertainties in production of seeds, and hence may allow increased industrial efficiency for the seed gathering and supply process.

Thus, in accordance with a further aspect of the present invention there is provided a method of determining availability for a future date of seeds grown for use in the production of a biofuel such as biodiesel, including the following steps: estimating a quantity of seeds that will be produced by a predetermined quantity of crops, before the crops have grown branches bearing seeds, and average time period for the crops to grow to a stage where they have grown seeds but not yet grown branches from the time they are planted, and determining, based on said average time, the future date on which said predetermined quantity of seeds will be available.

The determination of availability of seeds for a certain future date, as described above, enables better scheduling and use of resources, and more certainty in future supply of the seeds to other parties.

Thus, in accordance with yet another aspect of the present invention there is provided a method of regulating supply of seeds to be used in the production of a biofuel such as biodiesel, including the following steps:

i) determining a quantity of seeds to be produced by a future date;

ii) estimation of a quantity of crops needed to produce the quantity of seeds determined in step (a) by the method of gathering seeds as described above; and iii) performing the method referred to in step (ii), thereby ensuring said supply.

The method may further include the step of providing an offer to sale by a predetermined date a predetermined quantity of seeds.

BRIEF DESCRIPTION OF THE DRAWINGS

In order to understand the invention and to see how it may be carried out in practice, embodiments will now be described, by way of non-limiting examples only, with reference to the accompanying drawings, in which:

FIG. 1A is schematic top view of a field with seeds of Jatropha crops planted therein;

FIG. 1B is schematic front view of a portion of the field in FIG. 1A with the Jatropha seeds now being at a seedling stage;

FIG. 1C is schematic side view of a Jatropha plant at a stage of its development before branches have grown therefrom;

FIG. 1D is schematic side view of the Jatropha plant in FIG. 1C at a stage of its development after branches have grown therefrom;

FIG. 1E is schematic side view of the Jatropha plant in FIGS. 1C and 1D at a stage of its development after flowers bearing seeds have grown on the branches thereof.

DETAILED DESCRIPTION OF EMBODIMENTS

Figure 2:
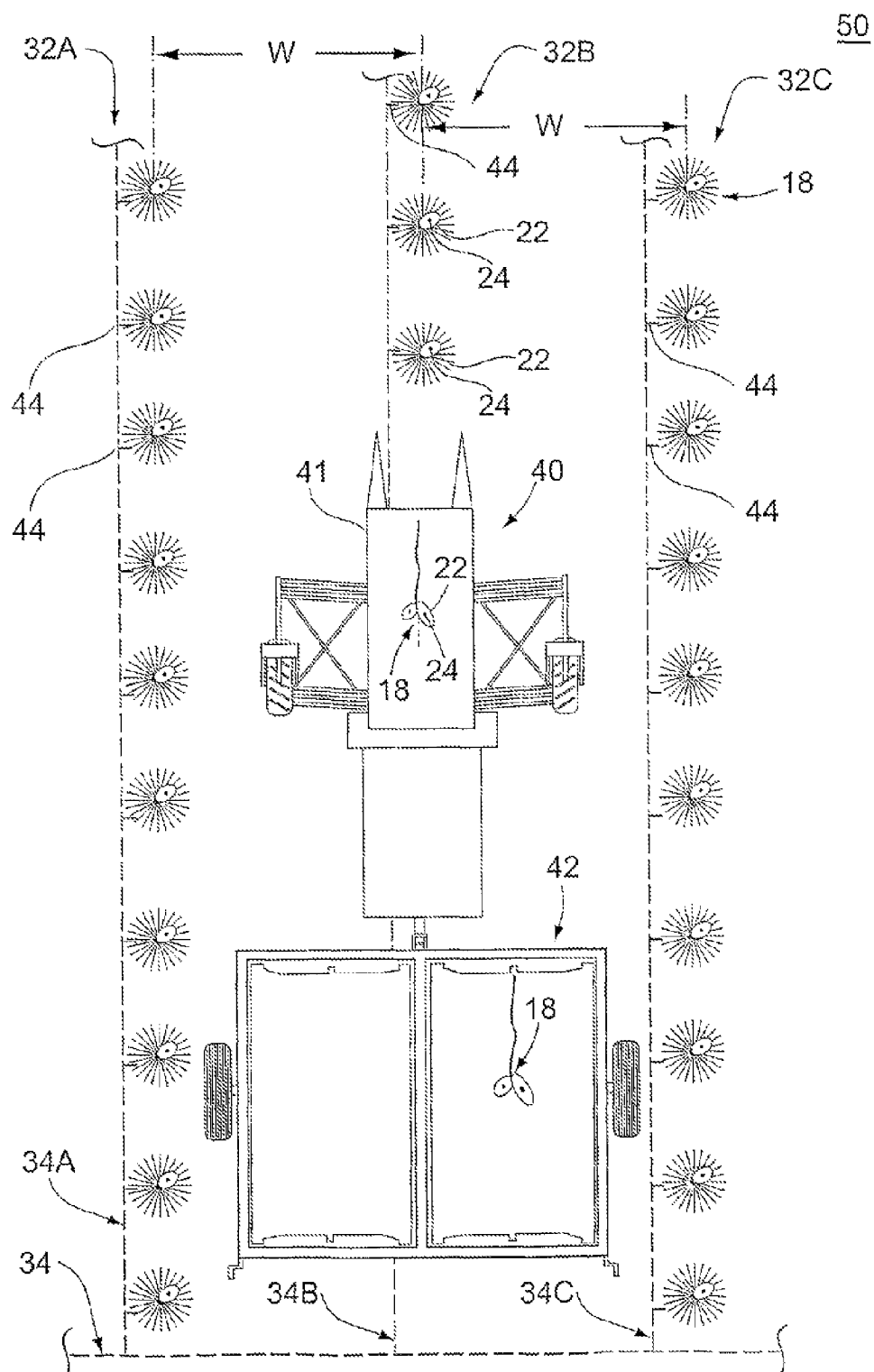
FIG. 2 is a schematic top view of a portion of a field comprising Jatropha plants, with a motor vehicle operating thereon.

In the present description, there is provided an example directed to Jatropha crops and the particular growth stages thereof. However, it should be understood that the present invention is applicable to any kind of crops, which first grows a stem bearing seeds and subsequently grows branches bearing seeds.

In particular, with reference to FIG. 1A, a field 10 is shown with several lines of culture or hybrid Jatropha seeds 12 planted therein.

In FIG. 1B, a first row of the Jatropha crops 14 (previously designated as 12 when at the seed stage), is shown at a seedling stage partially inside the ground 16. The crops 14 generally have a uniform stem height H1, above the ground.

In FIG. 1C, a Jatropha crop, generally designated 18, is shown at a growth stage where it comprises a stem 20 having flowers 22 bearing seeds 24 thereon. Notably, at this stage, the stem 20 has reached a maximum stem height H2, has not yet grown branches. The stem 20 has a height H2, greater than the height H1 of the Jatropha crops 14 (FIG. 1B) which are at the seedling stage. The height H2 is normally between 1-2 meters.

In FIG. 1D, the Jatropha crop, generally designated 26, (previously designated as 18 in the developmental stage in FIG. 1C) is shown with branches 28 having grown therefrom, the branches 28 not yet having grown flowers bearing seeds. The branches 28 extend to a height H3, higher than the height H2 of the stem 20.

In FIG. 1E, the Jatropha crop generally designated 30, (previously designated as 26 in FIG. 1D) is shown with branches 28 comprising flowers 22 bearing seeds 24. Optionally, trellising of the branches is carried out to allow a maximum number of flowers to grow therefrom. However, according to the present invention, the crops are cut before having reached this stage, as explained in more detail below.

With reference to FIG. 2, there is shown a field 50, comprising three lines of Jatropha crops 18 generally designated 32A, 32B, and 32C, which were planted at a seed stage, an underwater irrigation system 34, and a motor vehicle 40 adapted to cut the stems (not seen) of the Jatropha crops 18.

The elements in the field 50 are designed to take into account the future movement of the motor vehicle 40 therethrough. Thus, the crop lines (32A, 32B, 32C) of Jatropha crops 18 are spaced a distance W from each other. The spacing W is about 0.93-1.0 meters, so that for example the spacing between two non adjacent crop lines 32A, 32C may correspond to the width of the example motor vehicle 40 thus facilitating movement thereof therethrough. Additionally, it is advantageous to use the irrigation system 34, which is underground, so that irrigation elements thereof will not impede or be damaged by the motor vehicle 40.

The underground irrigation system 34 comprise feed lines (34A, 34B, 34C) adjacent to each line of crops (32A, 32B, 32C). Each feed line (34A, 34B, 34C) comprises a drip irrigation arrangement with a predetermined number of drippers 44 designated per a predetermined number of crops. While the feed lines (34A, 34B, 34C) are each shown with a single dripper 44 designated to provide water to each crop in crop line (32A, 32B, 32C), it should be noted that other arrangements may be suitable, for example one dripper per two crops.

The crops 18, having been grown via irrigation of the irrigation system 34 to a height of about 1 m, and are at the growth stage demonstrated in FIG. 1C, i.e. after flowers 22 bearing seeds 24 have grown on the stems thereof but before a majority thereof have grown branches bearing seeds. This growth stage is suitable for the crops 18 to be cut via the motor vehicle 40.

The motor vehicle 40 is adapted to cut the stems of the crops 18 and also collect the cut crops which comprise the flowers 22 and hence seeds 24. To achieve this, the motor vehicle 40 comprises a motorized portion (not marked) upon which an operator is seated, a cutting and collection portion 41 for cutting and collecting the crops 18, and an optional storage portion 42 for storing the collected crops 18. The motor vehicle 40 may be similar to (or an adjusted version of) a cotton stripper such as the Case IH Cotton Express® of Case IH Ltd.

Thus the motor vehicle 40 cuts and collects the crops 18, as shown. Notably, the collection is done immediately after the cutting, before the crops fall to the ground, and hence the flowers 24 are still attached to the crops 18.

The field is then rendered free of crops by plowing of the field, and is replanted with seeds or seedlings immediately afterwards. When the replanted crops have grown to an optimal seed bearing stage the cycle above is repeated.

It should be added that the determination that the crops above were at an optimal stage for cutting was determined in accordance with their maximum height and the percentage of crops bearing flowers. However, the optimal stage for cutting the seeds can also be determined in accordance with a different growth parameter such as a predetermined time. For Jatropha crops the predetermined time may be about 60 days from when a majority of the crops have reached the flowering stage of their growth cycle. In any case, the optimal time for cutting will normally be calculated in accordance with the stage at which the largest perceived number of seeds may be gathered from the cut crops, while the seeds remain attached to the crops and before a majority of the crops have grown branches with flowers bearing seeds.

In the above example, the amount of time taken to cut and collect the crops was not specified, and normally depends on the size of a field and the quantity of crops to be cut. Understandably, given the mechanized manner of cutting, it is conceivable that an entire field could be cut in a single operation, i.e. on a single day. Thus a quantity of seeds to be cut and collected on a future date may be accurately calculated. Therefore, all related logistics may be determined in advance for this date. For example the chosen date of cutting may be in accordance with when space becomes available in local storage facilities. Space may be made available prior to a predetermined date to facilitate stocking of new crops. Supply to customers may be pre-arranged to facilitate making space for the new crops. Similarly, customers may be notified in advance of a date on which new seeds will be available. Thus an offer to sale by a predetermined date of a predetermined quantity of seeds may be made in advance with high accuracy. Additionally, the planting of the crops may be made in accordance with the details of such offer.

Those skilled in the art to which this invention pertains will readily appreciate that numerous changes, variations and modifications can be made without departing from the scope of the invention mutatis mutandis. For example, the seeds could be cut by one type of vehicle and a different vehicle could be used to gather the cut crops. It should also be noted that other types of motor vehicles may be used as known in the art per se. For example a motor vehicle comprising a motorized portion in line with a cutting and collection portion, and not placed at the side thereof may be used. Further, any motor vehicle or number of motor vehicles may be used to facilitate the cutting, as needed in accordance with the size of the field and the amount of time desired to facilitate such cutting. Similarly, it should be noted that the cutting does not necessarily have to be completed on a single day, but may be within a specified short time period, and still provide benefits as mentioned above. Additionally, terminology used for different crop species and stages of their growth may vary. Therefore the terminology used in the specification and claims should be interpreted as per their meaning indicated by the specification and drawings.

What is claimed is:

1. A method of harvesting seeds suitable for the production of biofuel from crops of the kind that first grows a stem bearing seeds and subsequently grows branches bearing seeds, the method comprising:
   a) planting in a predetermined area, crops suitable for the production of biofuel;
   b) irrigating the crops until a majority thereof have grown seeds;
   c) providing a motor vehicle adapted for cutting the crops; and
   d) operating the motor vehicle to cut the crops before a majority thereof have grown branches bearing seeds.

2. The method of claim 1, wherein said operating of the motor vehicle to cut the crops in step (d) of claim 1 includes cutting all of the crops in the predetermined area.

3. The method of claim 1, constituting a part of a method of providing seeds for the production of biofuel, further comprising a step of gathering the seeds from said crops which have been cut.

4. The method of claim 3, wherein said gathering of the seeds is performed by the motor vehicle.

5. The method of claim 3, wherein said gathering includes gathering of all of the seeds in the predetermined area.

6. The method of claim 3, wherein said gathering of all of the seeds in the predetermined area is achieved in a single operation.

7. The method of claim 3, wherein after said gathering, the predetermined area is rendered free of crops to allow replanting of new crops therein.

8. The method of claim 7, wherein after said predetermined area is rendered free of crops, there is performed a repetition of steps (a) to (d) of claim 1 in said predetermined area.

9. The method of claim 8, further comprising a step of gathering the seeds from said crops which have been cut subsequent to the repetition of step (d) of claim 8.

10. The method of claim 9, wherein said repetition occurs at least once a year.

11. The method of claim 3, wherein after said gathering, stems left over in the ground in the predetermined area are irrigated to revive them for another round of flowering.

12. The method of claim 11, wherein after said stems are irrigated, there is performed a repetition of steps (c) and (d) of claim 1 in said predetermined area.

13. The method of claim 12, further comprising a step of gathering the seeds from said crops which have been cut subsequent to the repetition of step (d) of claim 12.

14. The method of claim 13, wherein said repetition occurs at least once a year.

15. The method of claim 1, wherein said crops planted in step (a) are seedlings or seeds.

16. The method of claim 1, wherein step (d) is carried out when a majority of the crops have stems which have reached a predetermined height.

17. The method of claim 1, wherein step (d) is carried out a predetermined time period after a majority of the crops have grown flowers bearing seeds on the stem thereof.

18. The method of claim 1, wherein said crops are selected from the group including Jatropha, Mahua, Pongamia and Simarouba.

19. The method of claim 1, wherein said crops are perennial.

20. The method of claim 1, wherein said crops are hybrid plants produced by impregnating the pistol of one species with the pollen of another.

\* \* \* \* \*